(No Model.)
J. MEMMOTT.
MANUFACTURE OF RAZOR BLADES.
No. 306,849. Patented Oct. 21, 1884.
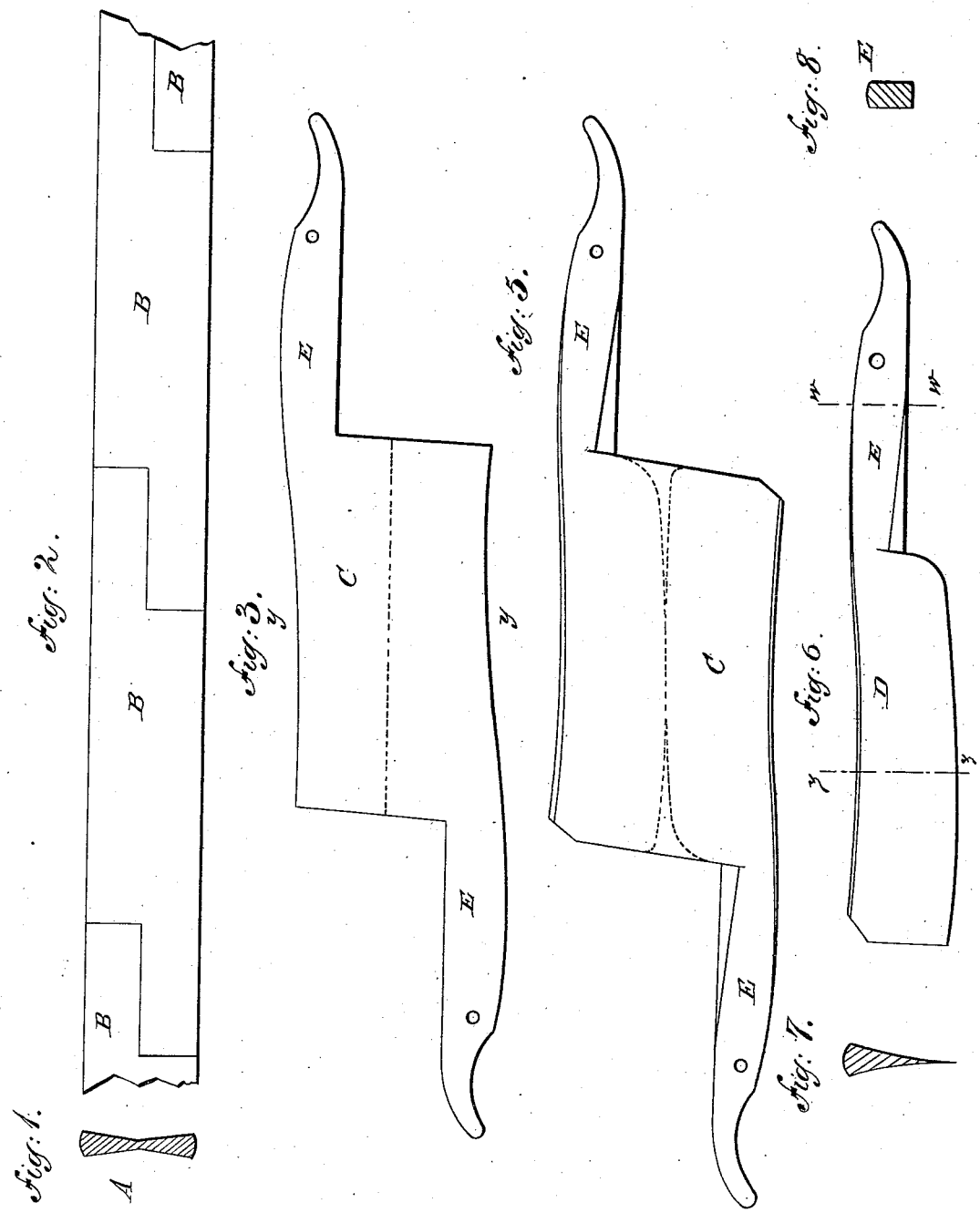
WITNESSES:
INVENTOR:
BY
ATTORNEYS.

UNITED STATES PATENT OFFICE.

JAMES MEMMOTT, OF WORCESTER, MASSACHUSETTS.

MANUFACTURE OF RAZOR-BLADES.

SPECIFICATION forming part of Letters Patent No. 306,849, dated October 21, 1884.

Application filed December 3, 1883. (No model.)

*To all whom it may concern:*

Be it known that I, JAMES MEMMOTT, of Worcester, in the county of Worcester and State of Massachusetts, have invented certain new and useful Improvements in the Manufacture of Razor-Blades, of which the following is a full, clear, and exact description.

Reference is to be had to the accompanying drawings, forming part of this specification, in which similar letters of reference indicate corresponding parts in all the figures.

Figure 1 is a cross-section of a steel bar as it comes from the rolling-mills. Fig. 2 is a plan view of a piece of steel bar, illustrating the manner in which it is cut into blanks. Fig. 3 is a plan view of a blank for a pair of razors as drawn into shape under a trip-hammer. Fig. 4 is a cross-section of the same, taken through the line *y y*, Fig. 3. Fig. 5 is a plan view of two razors as they come from the dies under the drop-hammer, jointed edge to edge, and showing in dotted lines their form when separated by a press-cutter. Fig. 6 is a side elevation of a razor-blade after being cut apart by a press cutter. Fig. 7 is a cross-section of the same, taken through the line *z z*, Fig. 6. Fig. 8 is a cross-section of the same, taken through the line *w w*, Fig. 6.

The object of this invention is to produce as finely-hammered razor-blade edges under trip and drop hammers as it is possible to produce by hand-forging.

The invention consists in cutting the blanks from steel bars rolled with concaved sides, then bringing the blanks by a trip-hammer to the general form of two razor-blades placed edge to edge, then by means of dies under a drop-hammer to bring the blanks to the desired shape of two perfectly-formed razors with the edges hammered to the desired compactness, and then cutting the blades apart, as will be hereinafter fully described.

A represents a steel bar which comes from the rolling-mill with its sides concaved, as shown in Fig. 1. The bar A is then cut into blanks B, each of which contains enough steel for two razor-blades, and is rabbeted at its ends, as shown in Fig. 2, so as to leave metal at its diagonal corners to form the shanks of the blades. The blanks B are then drawn under a trip-hammer into the general form, C E, of two razor-blades placed edge to edge, as shown in Fig. 3. The blank C E is then placed in dies under the drop-hammer and hammered until the steel for the cutting-edges of the blades has been brought to the desired compactness, and the blades brought to the desired shape. The blank C is then cut apart, as indicated by dotted lines in Figs. 3 and 5, and the blades D are sent to the grinders.

By forging the blades double or in pairs, and edge to edge, as hereinbefore described, the metal that is to form the cutting-edges of the blade can be hammered under trip and drop hammers until as good or a better quality of edge is produced than can be produced by hand-forging. By this mode of manufacture uniformity of shape and design can be produced direct from the forger, so as to save the labor and expense of having the grinders work out the desired shapes and designs from the necessarily rudely-shaped blades that come from the hand-forgers.

Having thus described my invention, what I claim as new, and desire to secure by Letters Patent, is—

The mode of forming razor-blades, substantially as herein shown and described, which consists in cutting to the form shown in Fig. 2 the blanks from steel bars rolled with concaved sides, then bringing the blanks so cut under a trip-hammer to the general form of two razor-blades placed edge to edge, as seen in Fig. 3, then by means of dies under a drop-hammer bringing the blanks to the desired shape of two perfectly-formed razors, as seen in Fig. 5, with the edges hammered to the desired compactness, and then cutting the blades apart, as set forth.

JAMES MEMMOTT.

Witnesses:
JOSEPH W. BATTELLE,
ALBERT J. MEMMOTT.